Oct. 26, 1965 JOST-DIETLAV KLOSE ETAL 3,214,156
RAPIDLY CLOSING VERTICAL CLOSURE
Filed Nov. 30, 1961 3 Sheets-Sheet 1

INVENTORS:
JOST-DIETLAV KLOSE
RUDOLF SEIZ
HEINZ EICKHOFF
by Michael S. Striker

Oct. 26, 1965  JOST-DIETLAV KLOSE ETAL  3,214,156
RAPIDLY CLOSING VERTICAL CLOSURE

Filed Nov. 30, 1961  3 Sheets-Sheet 3

INVENTORS:
JOST-DIETLAV KLOSE
RUDOLF SEIZ
HEINZ EICKHOFF by Michael S. Striker
   Attorney United States Patent Office 3,214,156
Patented Oct. 26, 1965

3,214,156
RAPIDLY CLOSING VERTICAL CLOSURE
Jost-Dietlav Klose, Essen, and Rudolf Seiz and Heinz Eickhoff, Bochum, Germany, assignors to Bochumer Eisenhutte Heintzmann & Co., Bochum, Germany, a firm
Filed Nov. 30, 1961, Ser. No. 156,054
Claims priority, application Germany, Dec. 7, 1960, B 60,380; July 3, 1961, B 63,123, B 63,124
16 Claims. (Cl. 268—58)

This invention relates to a self-closing cover plate for air shafts or emergency exits of shelters, particularly underground shelters.

In shelters, particularly air-raid shelters that have to meet the safety requirements of modern warfare, a difficulty consists in closing just in time the cover plates of the air shafts or emergency exits, which are normally open for airing purposes, in the event of a sudden emergency occurring. This difficulty is due, on the one hand, to the fact that the cover plates meeting the requirements with respect to strength and protection against radiation have a considerable weight, e.g. 25 tons and more and, on the other hand, that their closing time must not exceed approximately ½ to a maximum of one second, if the entry of injurious, possibly even lethal quantities of modern warfare agents, for example gamma rays, is effectively to be avoided.

In view of the great weight of such cover plates the requisite short closing time makes it impossible, at the moment of danger, to shut the cover plates by hand or mechanically, since even mechanical means, for reasons of construction, work too slowly or involve too great delay intervals, even if their actuation should take place automatically.

It is, therefore, the object of the present invention to provide an automatically closing cover plate having actuating means which, though of simple and sturdy construction, ensure at the moment of danger an automatic closing of the cover plate within the limits of the aforementioned requirements in so short a time that danger-involving quantities of warfare agents are prevented from entering the shelter.

For attaining this object the invention provides a self-closing cover plate for air shafts or emergency exits of shelters, particularly underground shelters, which comprises a vertical guide for the cover plate, means for lifting the cover plate along said guide from a final closing position into at least one open position, means for locking the cover plate in said open position, a control member responsive to abrupt changes in the atmosphere and associated with said locking means automatically to release the cover plate in the event of emergency and enable same to fall down under its own weight along the guide, and damping means associated with the cover plate for decelerating the free fall of said cover plate in a pre-sealing zone before reaching the final closing position.

The short closing time is primarily attained by dispensing with any mechanical or hydraulic means for moving the cover plate into its final closing position and using merely the free fall thereof. In consideration of the great weight, the downward movement of the cover plate is already decelerated before the latter has reached the final closing position, but only then when the cover plate already ensures a pre-sealing which prevents warfare agents from entering the shelter. Therefore, on the one hand, the time required for lowering the cover plate into its final closing position can be left out of consideration as far as safety is concerned and, on the other hand, the short closing time is obtained in that the release of the cover plate when being in its open position is automatically effected through the intermediary of the control member responsive to abrupt changes in the atmosphere. As control member there come into consideration such known instruments as respond substantially without delay to pressure impulses, abrupt rises in temperature and/or a sudden increase in radiation intensity as caused particularly by gamma, light and thermal rays or other radiation, and which are adapted to transfer their function in some expedient manner to the locking means. Suitable for this purpose are, for example, pressure responsive means, thermal fuses, Geiger counters or the like.

The cover plate conveniently consists of concrete embedded in a closed metallic bottom part, the sealing taking place in the region of a cover plate seating laterally enclosing the cover plate by means of tapered side surfaces, and of a steel ring coaxially enclosing the cover plate and mounted on top of the cover plate seating. The upper axial edge zone of the steel ring serves in this case for pre-sealing, whereas the sealing in the final closing position of the cover plate is effected by at least one packing ring associated with the cover plate seating and on which the cover when in closing position rests with its lower end face.

Expediently, the cover plate is guided by means of a piston-type guide rod associated with the cover plate and longitudinally movable in a lifting and damping cylinder.

The damping cylinder serves conveniently at the same time as lifting cylinder for lifting the cover plate into the open position. The lifting may be effected either by a hydraulic or pneumatic pressure medium. For locking the cover plate in the open position, the pressure medium employed for lifting the cover plate, or mechanical means may be used.

Moreover, convenient means may be provided for effecting the automatic locking of the cover plate also in the final closing position so as to prevent the cover plate from unintentionally being opened by suction effects or the like.

In one embodiment of the invention there is supported within the lifting and damping cylinder a flying lifting piston which causes the elevation of the cover plate and, to this end, is displaceable under the action of a hydraulic pressure medium. The flying lifting piston returns after the cover plate has been locked in the open position into its initial position under the action of a pneumatic pressure medium.

Another advantageous possibility consists in that the lifting and damping cylinder is of closed construction and that in a further cylinder which is of considerably smaller diameter than the lifting and damping cylinder and arranged coaxially therewith on the upstream side thereof, there is disposed a further lifting piston for elevating the cover plate, which lifting piston for this purpose is movable under the action of a hydraulic pressure medium and the piston rod of which engages in plunger-piston fashion in the cylinder accommodating the piston-type guide rod of the cover plate, the lifting piston after lifting and securing the cover plate in the open position returning, either by gravity or under the action of the hydraulic or pneumatic pressure medium, into its initial position.

In both aforedescribed embodiments the piston-type guide rod is conveniently provided with an axial bore that communicates through the intermediary of an adjustable relief valve with a radial outlet arranged immediately below the cover plate, the relief valve being adapted to be automatically operated, upon the occurrence of the pre-sealing condition, by the cover plate in such a manner that the latter is capable of descending to its final closing position under the action of its own weight by releasing the compressed air enclosed in the lifting and damping cylinder. The relief valve can be constructed, for example, in the form of a known high pressure relief valve or as a diaphragm having an adjustable cross-sectional area of passage.

In these embodiments of the invention as means for locking the cover plate in the open position expediently a mechanical locking device is used which consists of a plurality of steel balls loosely surrounding the piston-type guide rod of the cover plate and arranged to cooperate with spaced annular grooves provided in the guide rod. The steel balls are arranged for radial movement in a radial recess of an axially immovable housing and rearwardly supported against a V-ring which is axially movably guided within the housing and held in its locking position by means of a restoring element.

The automatic release of this mechanical locking device is conveniently effected hydraulically by means of a control system which may consist of a distributing slide valve movable in a control cylinder and arranged in a pressure medium conduit and of at least one control member responsive to abrupt changes in the atmosphere and capable of operating the distibuting slide valve.

In a further embodiment of the invention compressed air is used for elevating the cover plate and locking it in its open position, the control member responsive to sudden changes in the atmosphere being coupled to a slide valve arranged in an offtake conduit of the lifting cylinder and which in the case of emergency can instantaneously clear the cross-sectional area of said offtake conduit, a throttle valve being arranged in the offtake conduit for cooperation with a release lever associated with the cover plate and for decelerating the free fall thereof in the pre-sealing zone. The advantage of this embodiment consists in that for all three improtant actions, i.e. elevating the cover plate, locking it in the open position and damping its free fall in the pre-sealing zone, the same means, namely compressed air, may be use. For this purpose, the cover plate is not locked by mechanical means in its open position, but may be held there by the compressed air which in any case is in the cylinder.

In order to ensure that the cover plate is not elevated beyond the intended open position by the action of the compressed air being admitted into the lifting cylinder, the shutoff of the compressed air stream is conveniently controlled by the cover plate itself or by its piston-type guide rod, respectively. For this purpose a slide valve may be arranged in the compressed air feed conduit of the lifting cylinder to shut off the cross-sectional area thereof and which is expediently acted upon in the closing sense by a restoring element having an adjusting member capable of engaging, when the cover plate is in open position, through the intermediary of a feeler acted upon by the restoring element, in a locking recess in the piston-type guide rod. In this arrangement the slide valve arranged in the offtake conduit and operatively coupled to the control member responsive to abrupt changes in the atmosphere is rigidly connected with an additional slide valve arranged in the compressed air feed conduit, which slide valve is arranged on the downstream side of the slide valve shutting off the compressed air feed conduit in the open position of the cover plate. In the event of emergency, upon response of the control member and the resultant opening of the offtake conduit, this additional slide valve will take over the shutting off of the compressed air supply to the lifting cylinder when the slide valve arranged on the upstream side thereof, in the direction of flow of the compressed air, clears the cross-sectional area of the offtake conduit as the cover plate is descending.

In order to secure the cover plate also in the case of this embodiment in the final closing position against unintentional opening due to a suction effect or the like, one or more locking members may be provided which in the closing position of the cover plate will engage under the action of restoring elements in a peripheral annular groove in the piston-type guide rod and which may be coupled to control cylinders connected to the compressed air feed conduit, for acting upon said control cylinders in the unlocking sense by actuating a solenoid slide valve. The solenoid slide valve expediently connected with the control cylinders on the upstream side thereof and operable by hand is held by a restoring element in the locking position and is operatively coupled to a feeler which will engage, shortly before the cover plate reaches its final closing position, in the annular groove of the piston-type guide rod which serves for locking same, thereby shutting off the compressed air supply to the control cylinders of the locking members as well as to the control groups arranged on the downstream side of the locking means.

To enable the cover plate, when the danger has ceased to be elevated again into its open position, the solenoid slide valve may be manually opened by operating a switch, whereby at first the pressure air supply to the control cylinders of the locking members and subsequently, via a further slide valve conveniently arranged in the compressed air feed conduit and operatively coupled to a control cylinder of the locking members, to the control groups arranged on the downstream side of the locking means is cleared.

The throttle valve arranged in the pressure air offtake conduit is expediently equipped with an actuating member in the form of a roller lever, and the tripping lever cooperating therewith and associated with the cover plate may be provided with a guide race of such configuration that for the purpose of damping the free fall of the cover plate the compressed air offtake conduit of the lifting cylinder is first progressively throttled as soon as the pre-sealing position of the cover plate has been reached, and then instantaneously opened again so that the cover plate may quickly move into its final closing position.

Finally, a further simple and expedient arrangement for mechanically locking the cover plate in its open position consists in that the piston-type guide rod is hingedly coupled to a piston sealingly guided in the lifting and damping cylinder and constructed as an independent part, the locking means being embodied in an attachment member rigidly connected with the lifting and damping cylinder at the upper end thereof. With the attachment member is associated, in the region of a longitudinal bore enlarged with respect to the cylinder bore and serving for independently inclining the piston-type guide rod under its own weight in the open position of the cover plate, a transversely movable adjusting member enclosing the piston-type guide rod and coupled to a control member responsive to sudden changes in the atmosphere. By means of the control member, in the event of emergency, the transversely movable adjusting member is instantaneously movable into the coaxial position with respect to the lifting and damping cylinder, thereby moving the guide rod into the vertical position. With this simple but reliably working form of construction of the cover plate into the open position may be effected in any desired manner and even mechanically. Expediently, however, a hydraulic or pneumatic pressure medium is used, and the deceleration of the free fall of the cover plate in the pre-sealing zone, before the cover plate reaches its final closing position, is in each case effected by the compressed air present in the lifting and damping cylinder.

In order to ensure that the cover plate is reliably locked in its open position also in the case of a smaller angle of inclination of the piston-type guide rod, it is expedient to provide within the bore of the attachment member a recess. This recess is arranged below the transversely movable adjusting member and at a distance therefrom and serves to receive the lower end of the piston-type guide rod in its slanting position. This recess may be designed as an annular depression. For additionally ensuring that the piston-type guide rod remains in the slanting position it may be convenient to lock the locking member in the position corresponding to the slanting position of the piston-type guide rod. This may be advantageously effected through the intermediary of the control member coupled to the locking member.

The adjusting member is preferably transversely movably guided in a recess in the attachment member and constructed in the form of a slide valve and, to improve smooth running thereof, supported by means of antifriction bearings. The edges of the bore of the adjusting member enclosing the piston-type guide rod with the minimum possible radial play are expediently of convex configuration.

Several preferred embodiments of the invention will now be described by way of example and with reference to the accompanying drawings, in which.

Figure 1:
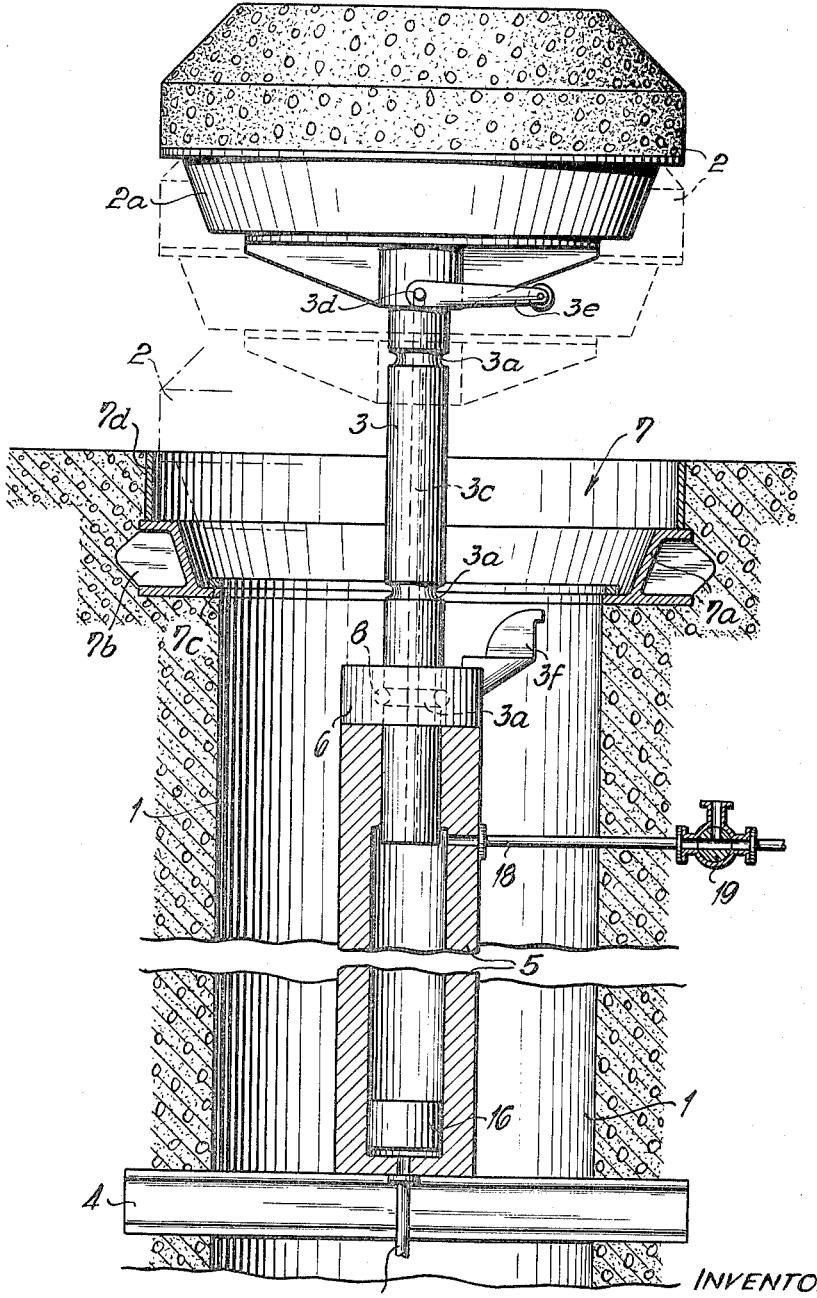
FIG. 1 is a schematic elevational view, partly in section, of a cover plate according to the invention, mounted in an air shaft or emergency exit of an underground shelter.

With reference now to FIG. 1, in a concrete-lined air shaft or emergency exit 1 of an underground shelter a cover plate 2 as proposed by the invention is mounted by means of a piston-type guide rod 3 associated therewith and longitudinally movable in a lifting and damping cylinder 5 which is secured in the air shaft or emergency exit 1 by means of a transom 4.

Figure 3:
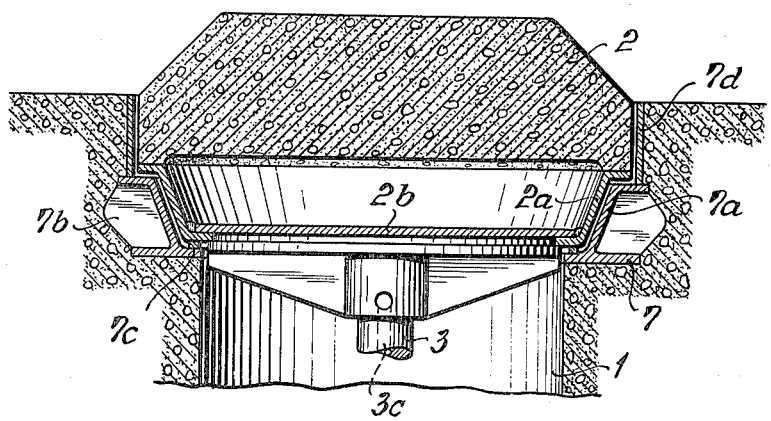
FIG. 3 is a cross-section through the cover plate.

As can be seen particularly from FIG. 3, the cover plate, which is of circular configuration, consists of massive concrete embedded in a closed metallic bottom part. This bottom part consists of a cast-steel ring 2a of substantially Z-shaped cross-section, to which is welded a bottom plate 2b consisting of sheet steel. At the upper end of the air shaft or emergency exit 1 a cover plate seating 7 is provided which peripherally surrounds the cover plate 2 and consists of a profiled cast-steel ring 7a having a conically tapering web corresponding to the taper of the cast-steel ring 2a of the cover plate 2. The cast-steel ring 7a is externally supported by radially arranged bracing ribs 7b which at the same time improve the anchorage of the cover plate seating 7 in the concrete. The lower inwardly directed flange of the cast-steel ring 7a is provided with at least one packing ring 7c on which the cover plate 2 in the final closing position rests with its lower end face of the inwardly directed flange of the Z-shaped cast-steel ring 2a. The packing ring 7c consists preferably of a combined rubber-asbestos packing and thereby ensures a protection against radiation as well as against the entry of gases. A cylindrical steel ring 7d is welded to the upper flange of the cast-steel ring 7a and coaxially encloses the cover plate 2 so as to snugly fit therearound, its uper axial edge zone effecting the pre-sealing of the cover plate 2 upon termination of the free fall of the latter.

Figure 2:
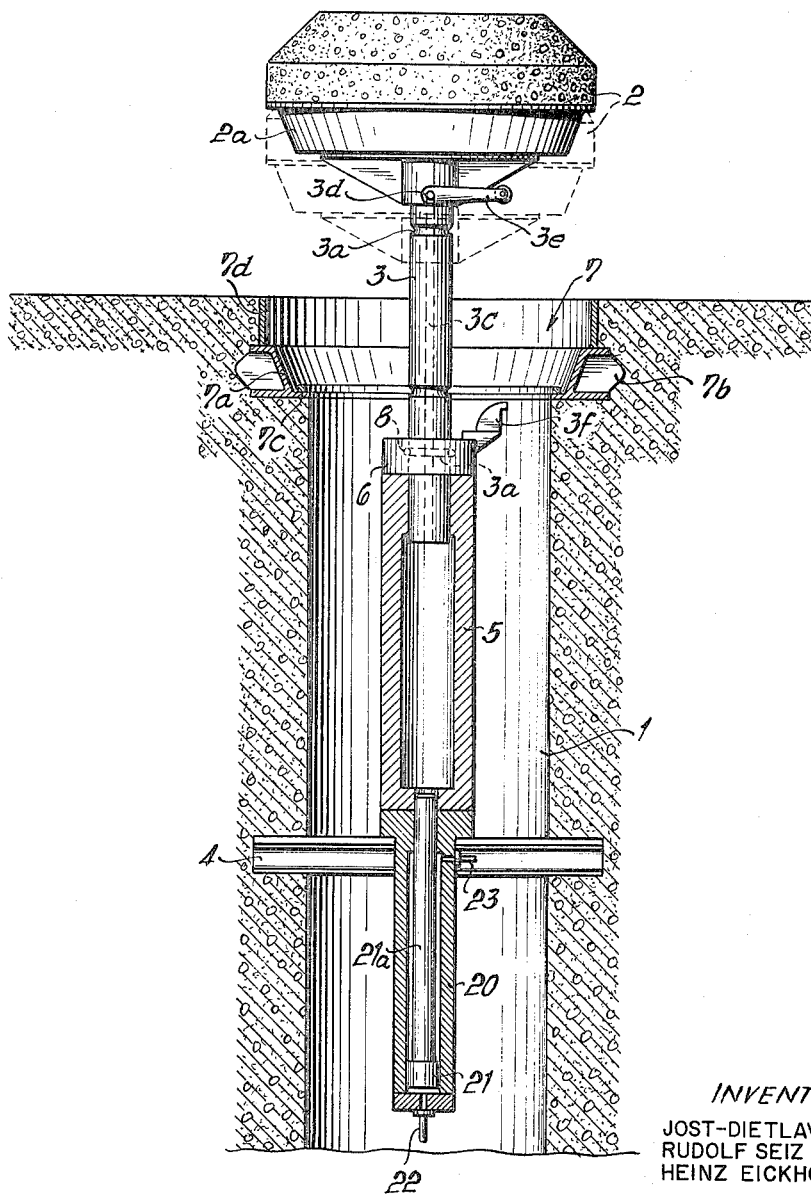
FIG. 2 is a view similar to FIG. 1, showing a modification of the form of construction illustrated in said figure.

In the embodiment according to FIGS. 1 and 2 a mechanical locking device 6 is provided for locking the cover plate 2 in the desired positions. The locking device 6, represented in FIG. 4 more in detail, consists of a housing 6a coaxially enclosing the piston-type guide rod 3 of the cover plate 2 and arranged on the upper end of the lifting and damping cylinder 5 so as to be aixally immovable. The housing 6a is provided on the inside with a radial recess 6b in which a plurality of steel balls 8 are radially slidably supported. The steel balls 8 are surrounded by a V-ring 9 shiftably guided in the axial direction within the housing 6a. Upon displacement of the V-ring 9, the steel balls 8 are pressed by an inclined surface of the latter radially inwardly in the closing sense, thereby engaging in the respective open positions of the cover plate 2, in one of a number of peripheral annular grooves 3a provided in the piston-type guide rod 3, thereby locking the latter.

To avoid unintentional release of the locking device 6, the locking position of the V-ring 9 is secured by helical pressure springs 10.

Figure 4:
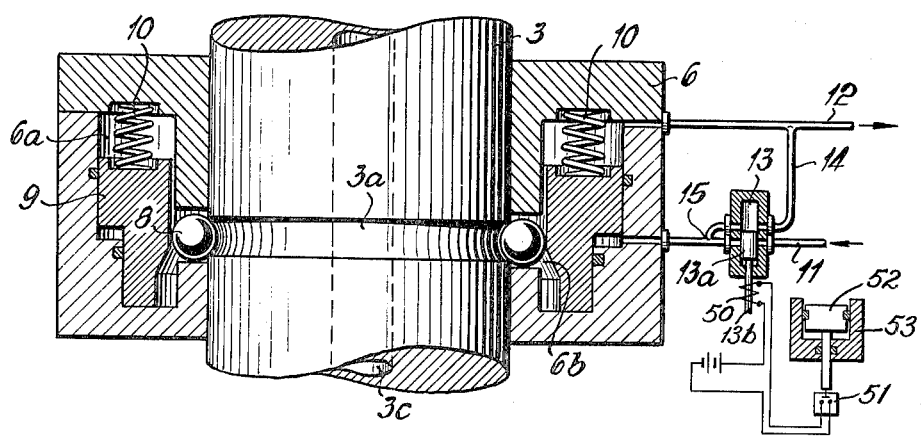
FIG. 4 is a cross-sectional view, on a larger scale, through means for locking the cover plate, and a schematic representation of associated control means, in the locking position of the locking means.

The actuation of the V-ring 9 is effected hydraulically. To this end the housing 6a is constructed as an annular cylinder and the V-ring 9 as an annular piston, the end of the cylinder acting upon the V-ring 9 in the releasing sense being connected through a pressure medium conduit 11 to a pressure medium reservoir, not shown in the drawings, and the opposite end of the cylinder through a return-flow conduit 12 to a collecting reservoir for the pressure medium, which reservoir is likewise not shown in the drawings. In the pressure medium conduit 11 there is arranged a control cylinder 13 accommodating a distributing slide valve 13a which is coupled to an electromagnetic switch, which receives its control impulse from a control member, e.g. a Geiger counter, a pressure meter, a thermal fuse, or the like, responsive to abrupt changes in the atmosphere. One control arrangement is schematically indicated in FIG. 4, in which the coil 50 of an electromagnetic switch cooperates with the rod 13b of the valve 13a to shift the latter upon energizing the coil from the position shown in FIG. 4 to that shown in FIG. 4a. Coil 50 is energized upon closing contacts 51, and the latter are closed when pressure greater than normal atmospheric pressure acts on piston 52 located in the open ended cylinder 53 and moves the piston 52 downwardly. With the return-flow conduit 12 leading to the collecting reservoir a branch conduit 14 is connected which extends transversely through the control cylinder 13 and opens at 15 into the pressure medium conduit 11 leading to the pressure medium reservoir.

In the locking position of the locking device 6, schematically represented in FIG. 4, the distributing slide valve 13a shuts off the flow of the pressure medium to the locking device 6, so that the V-ring 9 is held in the locking position by the helical pressure springs 10 acting thereagainst. To prevent pressure medium which has escaped through leaks in the distributing slide valve 13a into the pressure medium conduit 11 leading to the locking device 6, from entering the locking device 6 where it might cause a gradual displacement of the V-ring 9 into the release position, the branch conduit 14, in this position of the distributing slide valve 13a, is opened within the control cylinder 13 so that the pressure medium can drain off through the return-flow conduit 12 into the collecting reservoir.

Figure 4A:
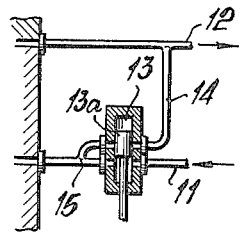
FIG. 4a is a schematic view of the control means in FIG. 4, in the releasing position of the locking means.

If, in the event of emergency, the distributing slide valve 13a is shifted through the intermediary of the electromagnetic switch, after having received a switching impulse from the control member, to the position represented in FIG. 4a, then the distributing slide valve 13a opens the pressure medium conduit 11 between the pressure medium reservoir and the locking device 6 so that the pressure medium will move the V-ring 9 against the action of the helical pressure springs 10 into the release position. In this position the branch conduit 14 is shut off within the control cylinder 13, while the pressure medium which might have entered, due to leakage losses, the cylinder chamber accommodating the helical pressure springs 10 will be forced back, in the course of the displacement of the V-ring 9, through the return-flow conduit 12 into the collecting reservoir.

When during the displacement of the V-ring 9 into the release position the inclined surface of the latter reaches the steel balls 8, the steel balls 8 are pushed radially outwardly under the weight of the cover plate 2, thereby following the inclined surface until they clear the annular groove 3a so that the cover plate 2 can slide downwards by gravity.

As shown in FIGS. 1 and 2, the air in the lifting and damping cylinder 5 is compressed as a result of the free fall of the cover plate 2 by the piston-type guide rod 3 of the cover plate 2 which thereby enters into the lifting and damping cylinder 5. The free fall of the cover plate 2 is decelerated by the compressed air cushion at the moment the coaxial peripheral edge portion of the cover plate 2 ensures pre-sealing in the region of the steel ring 7d.

To allow the compressed air in the lifting and damping cylinder 5 to escape after the pre-sealing position has been reached, and thus the cover plate 2 to descend to the final closing position, the piston-type guide rod 3 is provided with an axial bore 3c which communicates via a known relief pressure valve, not shown in the drawings, with a radial outlet 3d, provided immediately below the cover plate 2. The relief pressure valve is so adjusted that an escape of compressed air from the lifting and damping cylinder 5 does not occur at all during the free fall of the cover plate 2, or only to such an extent as hereby not to impair the reliable deceleration of the falling movement after the pre-sealing position has been reached. Associated with the relief pressure valve is a roller lever 3e which, in this position of the cover plate 2, is turned by an inclined surface 3f. The relief pressure valve is thereby adjusted in such a manner that the compressed air is allowed to escape and the cover plate 2 can safely descend by gravity to the final closing positon, in which it rests with the lower end face of the inwardly directed flange of its cast-steel ring 2a on the packing ring 7c.

In the embodiment according to FIG. 1, for elevating the cover plate 2 into the actually desired open position, a flying piston 16 is guided within the lifting and damping cylinder 5 so as to be movable by the action of a hydraulic pressure medium admitted into the lifting and damping cylinder 5 through a feed conduit 17. After the cover plate 2 has been locked in the open position, the flying piston 16 is lowered again to the initial position, in order not to obstruct the free fall of the cover plate 2 when released. If the weight of the flying piston 16 does not suffice to make the latter return into its initial position after the feed conduit 17 has been connected to the collecting reservoir, the return movement can be assisted by pressure air which is admitted to the piston area opposite the hydraulic pressure medium through a compressed air conduit 18 opening into the upper end of the lifting and damping cylinder 5. As soon as the flying piston 16 has returned into its initial position, the lifting and damping cylinder 5 is relieved of the compressed air, for example by opening a multiway cock 19, and subsequently the compressed air conduit 18 is shut.

The embodiment of the invention shown in FIG. 2 differs from that in FIG. 1 merely by the divergent design of the lifting means. According to this embodiment a separate lifting cylinder 20 having a diameter smaller than that of the lifting and damping cylinder 5, is coaxially connected with the lifting and damping cylinder 5 on the upstream side thereof. This offers the advantage that the quantity of hydraulic pressure medium required for lifting the cover plate 2 can be considerably smaller than that required in the form of construction shown in FIG. 1. In the lifting cylinder 20 there is guided a lifting piston 21 which has a piston rod 21a that projects in a plunger-piston fashion through a bore in the upper end face of the lifting cylinder 20 into the lifting and damping cylinder 5. If the cover plate 2 is to be lifted into the open position, the lifting cylinder 20 is acted upon by pressure fluid through a conduit 22 so that the lifting piston 21 raises and lifts the cover plate 2 as a consequence of the piston-type guide rod 3 resting on the upper end face of the piston rod 21a. At the upper end of the lifting cylinder 20 there is provided a bore 23 which only serves for venting the cylinder, but, if required, can also be used for feeding pressure fluid or air into the cylinder 20 in order to assist or accelerate the return movement of the lifting piston 21 into its initial position.

In order to preclude the danger that the cover plate 2 after having reached its final closing position is lifted by outer influences, for example by the suction following a blast pressure, one of the annular grooves 3a in the piston-type guide rod 3 is arranged for cooperation with the locking device in the closing position of the cover plate 2. Furthermore, a coupling (not shown in the drawings) is so provided between the cover plate 2 and the control member or the electromagnetic switch associated therewith, that the cover plate 2 at the moment of reaching the closing position indirectly effects the reversal of the distributing slide valve 13a, whereby the pressure medium being under the V-ring 9 is drained off by the action of the helical pressure springs 10 via the control cylinder 13, the branch conduit 14 and the return-flow conduit 12 into the collecting reservoir, and the steel balls 8 are pressed by the V-ring 9 into the upper annular groove 3a in the piston-type guide rod 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

We claim:

1. In an arrangement for rapidly closing substantially vertical air shafts and emergency exits of shelters, particularly underground shelters, comprising, in combination, annular means lining the upper end of an air shaft and having an upper inner substantially vertical annular surface portion; a heavy cover plate having a peripheral surface substantially congruent with said upper inner surface portion, said cover being movable between an open position upwardly spaced from said annular means and a closed position arranged substantially within said annular means with said peripheral surface of said cover in substantial sealing engagement with said upper inner annular surface portion; combined lifting and damping means associated with said cover plate for decelerating movement of said cover plate from said open to said closed position and for lifting said cover plate from said closed to said open position, said combined lifting and damping means including an elongated substantially vertical cylinder means fixedly mounted in the air shaft and piston means including a piston-type guide rod fixed at the upper end thereof to said cover plate and extending in sealing engagement with a least an upper portion of said cylinder means into the latter to be slidably guided therein, said guide rod forming the only support of said cover plate in the open position of the latter; discharge passage means communicating with the interior or said cylinder means for discharging air therefrom; valve means for controlling said discharge passage means and movable between an open and a closed position; means moving said valve means into said closed position when said cover plate is in the open position thereof; releasable blocking means cooperating with said guide rod for releasably locking the same in a position in which said cover plate connected thereto is in said open position; control means responsive to abrupt changes in the atmosphere and cooperating with said locking means to automatically release the same when such abrupt change occurs so that said guide rod will move under the weight of said cover plate rapidly downwardly in said cylinder means while said valve means is closed so as to compress the air therein and to brake thereby the substantially free fall of said cover plate shortly before the latter enters said annular means; and valve opening means associated with said cover plate for opening said valve means in such a manner as to permit gradual discharge of compressed air from said cylinder means while said cover plate enters into said annular means at which time said upper inner surface portion of said annular means cooperates with said peripheral surface of said cover plate to preseal the air shaft, such opening of said valve means slowly reducing the braking action of the compressed air and permitting gradual descent of said cover plate into the final closed position of the latter.

2. An arrangement as set forth in claim 1 in which said annular means comprises a steel ring having an upper inner surface portion in form of a straight circular cylinder and a lower frustoconical surface portion and at least one transverse shoulder face at one end of said frustoconical portion and in which said cover plate has surface portions matching the surface portions of said annular means.

3. An arrangement as set forth in claim 1 in which said combined lifting and damping means includes a flying piston arranged in said cylinder means beneath the lower end of said guide rod; and means for feeding compressed air into said cylinder means beneath said flying piston.

4. An arrangement as set forth in claim 1 in which said cylinder means includes an upper damping cylinder having a lower portion of a diameter greater than that of said guide rod, and a lifting cylinder of a diameter substantially smaller than said damping cylinder located beneath the latter and communicating at the upper end thereof with said damping cylinder; a lifting piston slidably arranged in said lifting cylinder; and means for feeding pressure fluid into and out from said lifting cylinder to raise during feeding of pressure fluid into said lifting cylinder said lifting piston into engagement with said guide rod to thereby lift the cover plate connected thereto.

5. An arrangement as set forth in claim 1 in which said discharge passage means is in form of a bore extending in axial direction through said guide rod from the lower end of the latter and having an upper open end communicating with the atmosphere adjacent to the cover plate.

6. An arrangement as claimed in claim 1, wherein said locking means including an axially immovable housing, a V-ring axially movable in said housing, an annular radial recess in said housing, and a plurality of steel balls radially movable in said radial recess and abutting against said V-ring, and wherein spaced annular grooves are provided in the piston-type guide rod, said steel balls being arranged so as to surround said piston-type guide rod for cooperation with said annular grooves.

7. An arrangement as claimed in claim 6, wherein the housing of the locking device is constructed as a pressure medium cylinder and the V-ring, which is axially movable therein, is constructed as an annular piston, the releasing side of the cylinder being connected through the intermediary of a distributing slide valve to a pressure medium reservoir, whereas the opposite side of the cylinder is connected to a collecting reservoir for the pressure medium.

8. An arrangement as claimed in claim 6, wherein restoring elements are provided for securing the V-ring in its locking position.

9. An arrangement as claimed in claim 8, wherein hydraulic means are provided for releasing the mechanical locking device, said hydraulic means including a pressure medium conduit, a control cylinder arranged in said pressure medium conduit, and a distributing slide valve in said control cylinder, said distributing slide valve being operable by at least one control member responsive to abrupt changes in the atmosphere.

10. An arrangement as claimed in claim 9, wherein an electromagnetic switch is coupled to the distributing slide valve, said electromagnetic switch receiving its switching impulse from at least one control member associated therewith.

11. An arrangement as claimed in claim 9, wherein a return-flow conduit is connected to the collecting reservoir, a branch conduit connects said return-flow conduit with a pressure medium conduit at a point lying between the locking device and the distributing slide valve and extends through the control cylinder so that the distributing slide valve in the normally closed position can shut off the pressure medium feed to the locking device only and leakage losses are conducted away into the collecting reservoir, whereas in the release position of the distributing slide valve, which corresponds to the event of emergency, the pressure medium feed to the locking device is released and the branch conduit shut off.

12. In an arrangement for rapidly closing substantially vertical air shafts and emergency exits of shelters, particularly underground shelters, comprising, in combination, annular means lining the upper end of an air shaft and having an upper inner substantially vertical annular surface portion; a heavy cover plate having a peripheral surface substantially congruent with said upper inner surface portion, said cover plate being movable between an open position upwardly spaced from said annular means and a closed position arranged substantially within said annular means with said peripheral portion of said cover plate in substantially sealing engagement with said upper inner annular surface portion; combined lifting and damping means associated with said cover plate for decelerating movement of said cover plate from said open to said closed position and for lifting said cover plate from said closed to said open position, said combined lifting and damping means including an elongated substantially vertical cylinder means fixedly mounted in said air shaft, a guide rod fixed at the upper end thereof to said cover plate and forming in the open position of said cover plate the only support for the latter, said guide rod extending with a lower end thereof into said cylinder means, said cylinder means having an upper end in sealing engagement with said guide rod, and a separate piston arranged in said cylinder means beneath said lower end of said guide rod, said piston movable in said cylinder means between a lowered and a raised position; first conduit means communicating with the interior of said cylinder means beneath said piston for feeding pressure fluid into said cylinder means beneath said piston to move the latter from said lowered to said raised position and said piston engaging during said movement said lower end of said guide rod to raise the latter to move thereby said cover plate to said open position; releasable locking means cooperating with said guide rod for releasably locking the latter in said raised position to thus hold said cover plate in said open position, said piston being movable from said raised to said lowered position while said guide rod is locked by said locking means in its raised position; discharge passage means communicating with the interior of said cylinder means for discharging air therefrom; valve means for controlling said discharge passage means and movable between an open and a closed position; means moving said valve means into said closed position when said cover plate is in the open position thereof; control means responsive to abrupt changes in the atmosphere and cooperating with said locking means to automatically release the same when such abrupt change occurs so that said guide rod will move under the weight of said cover plate rapidly downwardly in said cylinder means compressing the air therein to brake the substantially free fall of said cover plate shortly before the latter enters said annular means; and valve opening means associated with said cover plate for opening said valve means in such a manner as to permit gradual discharge of compressed air from said cylinder means while said cover plate enters into said annular means at which time said upper inner surface portion of said annular means cooperates with said peripheral surface of said cover plate to preseal the air shaft such opening of said valve means slowly reducing the braking action of the compressed air and permitting gradual descent of said cover plate into the final closed position of the latter.

13. An arrangement as set forth in claim 12 and including second conduit means for feeding compressed air into said cylinder means above said piston for moving said piston from said raised to said lower position while said guide rod is held by said locking means in said raised position so as to provide a free space between said lower end of said guide rod and the upper end of said piston; and means for discharging the compressed air from said space after said piston has been moved to said lowered position, said compressed air being discharged so as not to interfere with the initial substantially free fall of said cover plate.

14. An arrangement as set forth in claim 13 in which said last mentioned means include a valve in said second conduit means movable between a first position connecting the interior of said cylinder means to a source of compressed air, a second position connecting the interior of said cylinder means to the atmosphere, and a third position for closing said second conduit means.

15. An arrangement as defined in claim 12 in which said cylinder means has beneath said upper end in sealing engagement with said guide rod an inner cylindrical surface portion of a diameter greater than that of said guide rod.

16. In an arrangement for rapidly closing substantially vertical air shafts and emergency exits of shelters, particularly underground shelters, comprising, in combination, annular means lining the upper end of an air shaft and having an upper inner substantially vertical annular surface portion; a heavy cover plate having a peripheral surface substantially congruent with said upper inner surface portion, said cover being movable between an open position upwardly spaced from said annular means and a closed position arranged substantially within said annular means with said peripheral surface of said cover in substantial ceiling engagement with said upper inner annular surface portion; combined lifting and damping means associated with said cover plate for decelerating movement of said cover plate from said open to said closed position and for lifting said cover plate from said closed to said open position, said combined lifting and damping means including an elongated substantially vertical cylinder means fixedly mounted in said air shaft and piston means including a piston-type guide rod fixed at the upper end thereof to said cover plate and extending in sealing engagement with at least an upper portion of said cylinder means into the latter to be slidably guided therein, said guide rod forming the only support of said cover plate in the open position of the latter; releasable locking means engaging said guide rod for releasably locking the same in an upper position in which said cover plate connected thereto is in said open position; passage means communicating with the interior of said cylinder means for feeding a pressure fluid thereinto to lift thereby said piston means and said cover plate connected thereto from said closed to said open position and for discharging pressure fluid from said cylinder means after said cover plate has been lifted and after said releasable locking means have locked said guide rod in said upper position so that after discharge of pressure fluid from said cylinder means the interior thereof is filled with air substantially under atmospheric pressure; control means response to abrupt changes in the atmosphere and cooperating with said locking means to automatically release the same when such abrupt change occurs so that said guide rod will move under the weight of said cover plate rapidly downwardly in said cylinder means compressing the air therein to brake the substantially free fall of said cover plate shortly before the latter enters said annular means; discharge passage means communicating with the interior of said cylinder means for discharging the thus compressed air therefrom; valve means for controlling said discharge passage means; and valve operating means associated with said cover plate for controlling said valve means in such a manner to permit gradual discharge of compressed air from said cylinder means at the moment said cover plate enters into said annular means at which time said upper inner surface portion of said annular means cooperates with said peripheral surface of said cover plate to preseal the air shaft.

References Cited by the Examiner

UNITED STATES PATENTS

| | | | |
|---|---|---|---|
| 2,185,646 | 1/40 | Noland et al. | 268—123 |
| 2,617,646 | 11/52 | Stukes | 268—123 |
| 2,629,348 | 2/53 | Kifferstein | 109—1 |
| 2,792,794 | 5/57 | Miller | 109—1 |
| 3,075,448 | 1/63 | Cohen | 98—1 |

FOREIGN PATENTS 506,309   10/54   Canada.

HARRISON R. MOSELEY, *Primary Examiner.*